(12) United States Patent
Vetter et al.

(10) Patent No.: US 7,096,899 B2
(45) Date of Patent: Aug. 29, 2006

(54) AUTOMATIC TANK CLOSURE FOR A FUEL TANK

(75) Inventors: Siegfried Vetter, Treuchtlingen (DE); Markus Stephan, Gnotzheim (DE)

(73) Assignee: Alfmeier Prazision AG Baugruppen, (DE)

( * ) Notice: Subject to any disclaimer, the term of this patent is extended or adjusted under 35 U.S.C. 154(b) by 0 days.

(21) Appl. No.: 10/957,869

(22) Filed: Oct. 4, 2004

(65) Prior Publication Data

US 2005/0178469 A1 Aug. 18, 2005

(30) Foreign Application Priority Data

Oct. 2, 2003 (DE) ................. 103 45 920
Oct. 1, 2004 (DE) ............. 10 2004 048 357

(51) Int. Cl.
*B65B 1/04* (2006.01)
(52) U.S. Cl. ............ 141/350; 141/348; 141/349; 220/86.2
(58) Field of Classification Search ........ 141/346–351; 220/86.2
See application file for complete search history.

(56) References Cited

U.S. PATENT DOCUMENTS

| | | |
|---|---|---|
| 4,759,458 A | 7/1988 | Fischer |
| 4,977,936 A | 12/1990 | Thompson et al. |
| 5,027,868 A | 7/1991 | Morris et al. |
| 5,431,199 A | 7/1995 | Benjay et al. |
| 5,660,206 A | 8/1997 | Neal et al. |
| 5,921,424 A | 7/1999 | Palvolgyi |
| 5,931,206 A | 8/1999 | Simdon et al. |
| 5,937,922 A | 8/1999 | Hor et al. |
| 5,950,655 A | 9/1999 | Benjey |
| 5,988,238 A | 11/1999 | Palvolgyi |
| 6,029,719 A | 2/2000 | Hor et al. |
| 6,095,207 A | 8/2000 | Enders |
| 6,474,376 B1 * | 11/2002 | Hagano et al. ............. 141/350 |

FOREIGN PATENT DOCUMENTS

DE 19837783 2/2000

OTHER PUBLICATIONS

Search Report dated Jun. 29, 2005 for French application 0410441000 filed Oct. 4, 2004.
English language translation of Search Report dated Jun. 29, 2005 for French application 0410441000 filed Oct. 4, 2004.

* cited by examiner

*Primary Examiner*—Timothy L. Maust
(74) *Attorney, Agent, or Firm*—Dority & Manning, P.A.

(57) ABSTRACT

An automatic tank closure for a motor vehicle tank with a housing having a penetrating input opening and having an opening and closing closure flap with pivotal bearings, which is subjected to spring loading in the closing direction is provided. The closure flap is located within the input opening for the closing of the same and whereby in the closed position between the closure flap and the housing is placed a sealing surface with a sealing seat, which conically widens itself toward the interior of the tank and coacts with a sealing ring. The sealing ring is designed with at least one lip seal and sealingly coacts with the sealing surface.

16 Claims, 7 Drawing Sheets

AUTOMATIC TANK CLOSURE FOR A FUEL TANK

FIELD OF THE INVENTION

The invention concerns an automatic tank closure for the fuel tank of a motor vehicle.

BACKGROUND OF THE INVENTION

Tank closure devices, such as have been disclosed by DE 198 37 783 A1, possess a housing which is penetrated by an opening for the filling of a tank, whereby the opening can be closed internally by a shut-off flap, which is spring loaded in its closing direction. On the closure flap is to be found, in the known closure device, a sealing ring serving as an O-ring, which coacts with a sealing-seat, which seat is conical and widens toward the inside of the tank. In order to achieve a high degree of sealed off tightness (for example LEV-II or PZEV-Norm), the sealing ring must be pressed against the sealing seat at a relatively high pressure. In a multitude of cases, the conventional tank closure devices accordingly operate with strong springs. It then becomes quite possible, that a greater expenditure of force is required of the user for the opening of the closure flap, and that, from the standpoint of evaporation measures, it is required to avoid, on the snapping shut of the closure flap, a wide spread spraying of fuel or indeed even a danger of traumatic personal harm. In the case of other known modes of fuel tank closure design, somewhat similar to DE 198 37 783 A1, weak springs were allowed, which permitted an easy opening of the closure flaps. In this case, however, it is still expensive in time and effort, to bring the sealing ring against the locking mechanism which presses against sealing seat, in order to achieve the necessary pressure for sufficient sealing action.

BRIEF SUMMARY OF THE INVENTION

The present invention is directed to an automatic tank closure for a motor vehicle tank, which is easy to open and can assure a sufficiently tight seal without the use of a locking mechanism.

One aspect of the invention encompasses a sealing seat with a sealing surface, which coacts with a sealing ring and has a conical sealing seat which increases in diameter toward the interior of the tank, and is provided with a sealing ring, which is designed as a lip-seal, whereby the sealing ring has at least one concentric lip which coacts with a sealing surface.

Generally, the conical sealing geometry reduces the required closing force of the closure flap, so that a correspondingly weaker shut-off spring can be installed, while at the same time, a sufficient pressure can be attained. A further reduction of the pressing force and simultaneously, an increase of the tightness of the seal is achieved by the shaping of the sealing ring as a lip-seal. A lip-seal is essentially more easily deformed elastically than is the case with an O-ring. Where the O-ring is concerned, the change in shape is practically solely defined by the elasticity of the elastomer employed. Because of the easy deformation of the seal-ring, not only the pressing force can be diminished, especially at lower temperatures, but tolerances are compensated for in respect to the components of the tank closure mechanism and of the seal-ring itself. These additional seal-rings have cross sections similar to those described above.

An additional advantage of the proposed sealing ring is, that its lip-seal can be so shaped, that it, due to the inside pressure of the tank, presses against the sealing seat and thereby its sealing effectiveness is increased. Because of the eccentric, pivotal placement of the closure flap, upon closure of the same, the sealing ring comes in contact exclusively with a circumferential section of sealing surface. The relative movement between the sealing surface and the sealing ring leads, when an O-ring is employed, leads to a state of twisting or distortion of the O-ring. This has an effect upon the durability of the same as well as to a degradation of its sealing action. Such a twisting is advantageously excluded by the invention, especially when, as proposed in an advantageous embodiment example, the sealing ring possesses a flat side located remotely from the sealing lip. It is upon this flat side, that the sealing ring abuts itself against an opposed surface which also supports it. In this way, the centering of the hinged closure flap in the sealing seal is improved.

In another aspect of the invention, the sealing tightness is increased by a plurality, at least two sealing lips providing, so to speak, successive rings in the axial direction. More lip-seals also increase the reliability of the desired sealing in case of a contamination of the closure area. If a lip-seal, because of the presence of foreign material, does not precisely sit on the seal surface, then the other lip-seals take over the sealing function as assurance. In a large number of instances, this is the case, when two lip-seals units—as seen in cross-section, run inclined to one another, whereby they open between them an angle with the sealing surface.

A further improvement of the tightness of the sealing ring on its flat side can be achieved if this carries with it several, or at least two, lip-seals at defined axial distances from one another. Because of the fact, that the lip-seals exhibit a separative distance from one another in the axial direction, they likewise prevent, as in the case of a level plane contact surface of the flat side, that the sealing ring, for instance an O-ring, becomes twisted into itself in the final phase of the closure procedure.

In an advantageous embodiment, the closure flap is installed on the housing in a pivotal bearing, that a self-acting centering of the closure flap in the sealing seat is made possible.

Due to the self-centering of the closure flap in a conical sealing seat, a wide ranging tolerance compensation for the individual components of the automatic tank closure is provided. In this way, it is possible, that not only the original manufacturing clearances of the tank closure flap are compensated for, but also those, which, for example, arise from the aging or the swelling of the sealing elements by the vapor of the fuel during the operative life of the tank closure flap in its operative life. For the self-acting centering of the closure flap in the sealing seat, no further auxiliary measures are necessary, since this is a universal characteristic common to any conical seating.

When the swelling of the sealing rings occurs, then the diameter thereof is also enlarged. The result is, that the closing/opening behavior of the closure flap and the pressing force change themselves, since the sealing ring, in the same position in the sealing seat must be more greatly deformed in the radial direction than it was in the original non-swollen condition. In order to bring about some aid in this occurrence, a pivoting bearing is provided, which permits of an axial sliding of the closure flap in the closure direction. When this is done, the sealing surface presents such a length, that it is subjected to different loads, arising from changed axial positions due to axial sliding of the closure flap relative to the sealing ring. Because of the shaping, it is possible that the axial displacement of the closure flap can, with self-adjustment, accommodate itself for sealing rings which are radially expanded by swelling. Advantageously, the axial displacement is brought about by the combination of a pivotal bearing, which comprises an elongated opening eye molded onto the closure flap and a pivot axle, which transversely penetrates elongated opening.

The sealing ring is affixed to a rim area of the closure flap. This position was chosen with consideration given to simplifying the assembly and in regard to characteristics of freedom from disturbance possibilities which could be exhibited by this variant of an embodiment of the present invention.

BRIEF DESCRIPTION OF THE DRAWINGS

The invention will now be more fully explained and described with the aid of the appended drawings of embodiments of the invention. There is shown in.

DETAILED DESCRIPTION OF THE DRAWINGS

Figure 1:
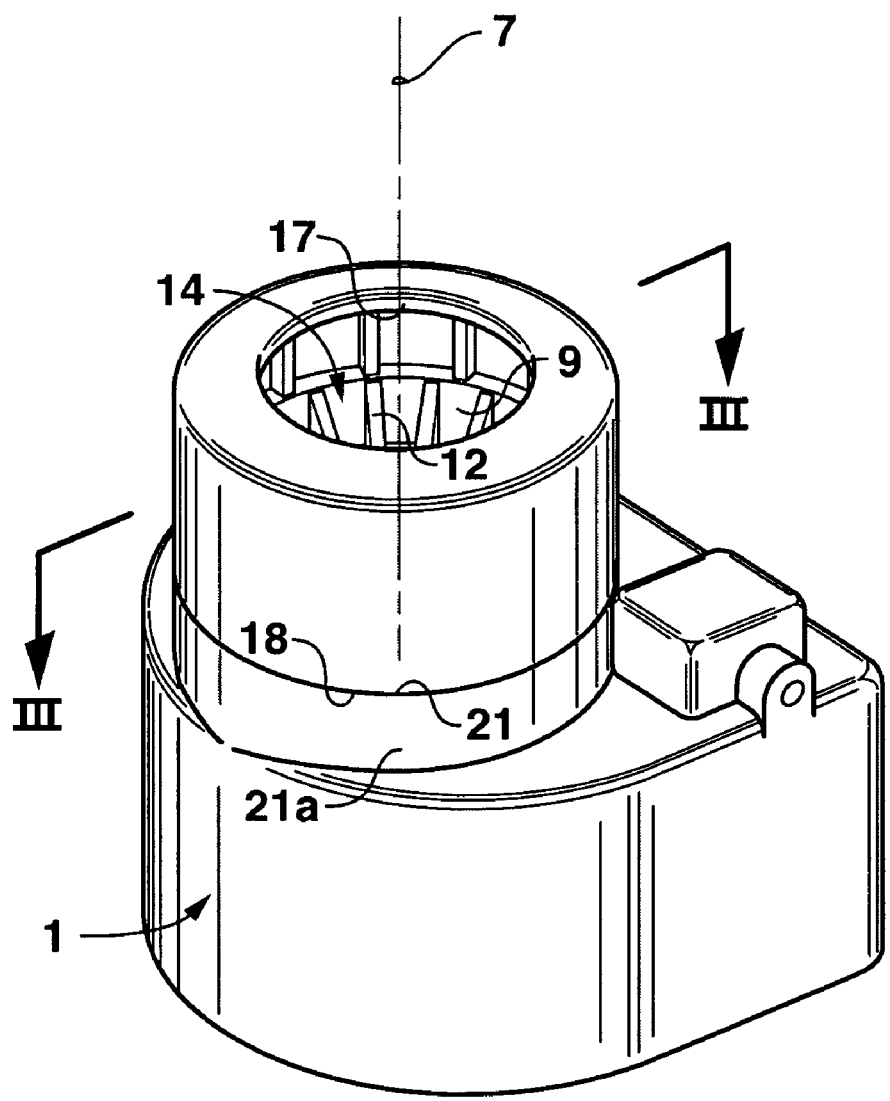
FIG. 1 an automatic tank closure in a perspective presentation.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

Figure 2:
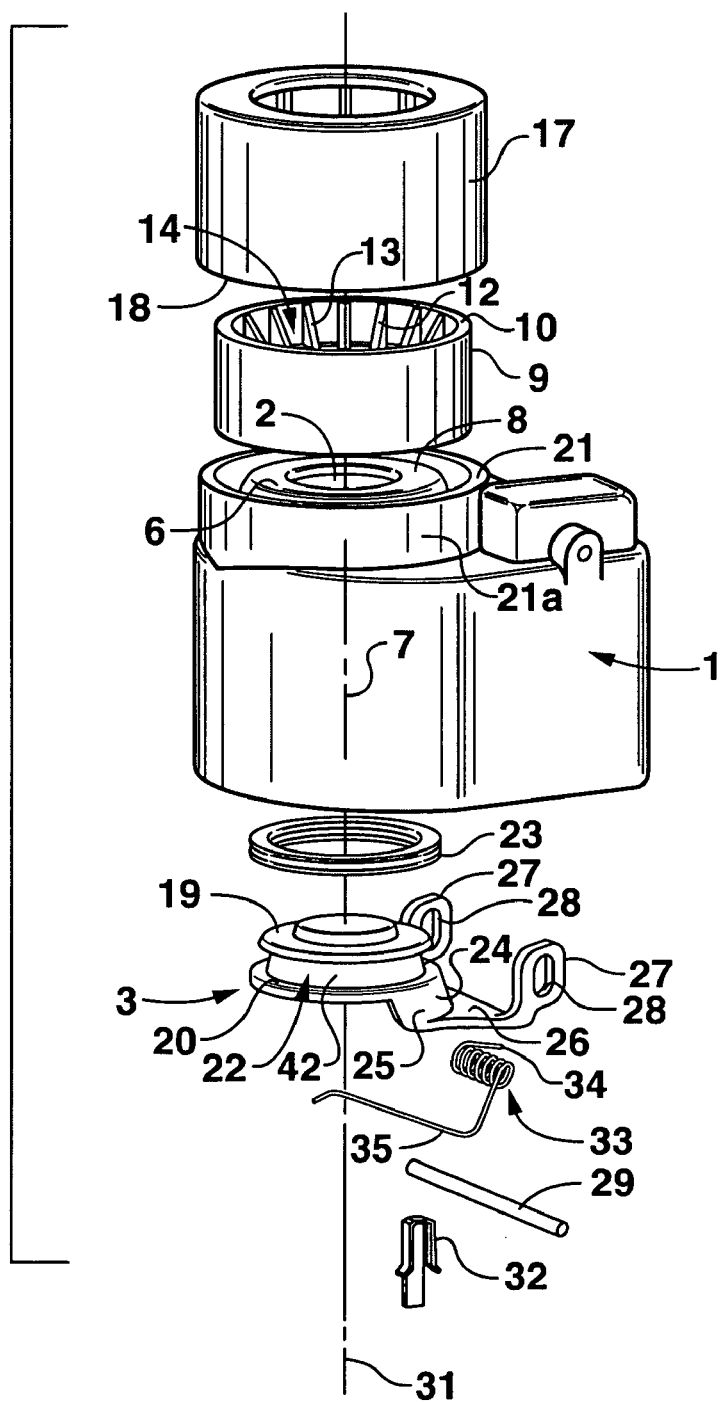
FIG. 2 a perspective, exploded view of the tank closure of FIG. 1.
Figure 3:
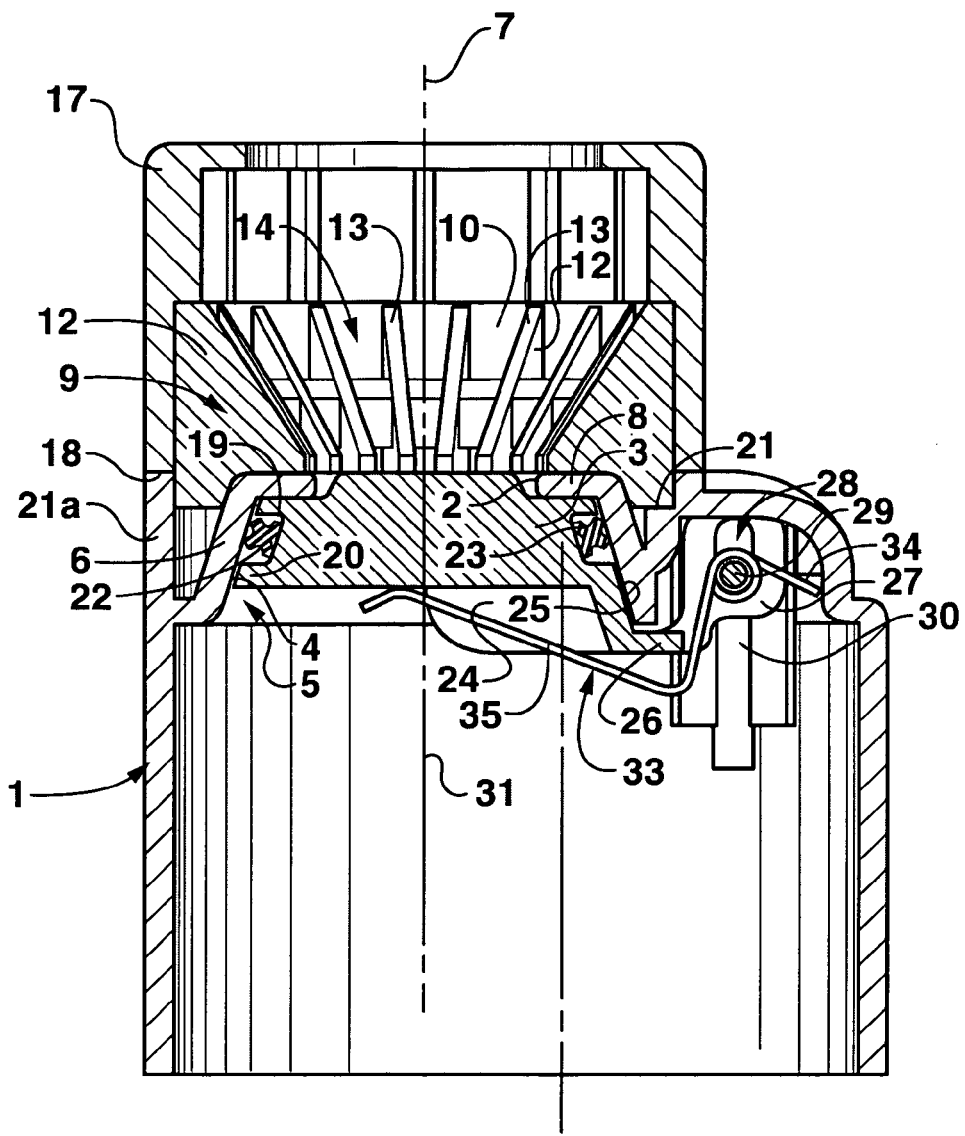
FIG. 3 a section, corresponding to section line III—III in FIG. 1.

As may be immediately inferred from FIGS. 1–3, a tank closure assembly includes as principal components; a housing 1, which is penetrated through its upper side by an opening 2 for the input of fuel; a pivoted flap 3, which is hingedly installed inside the housing 1 and serves the purpose of blocking off the opening 2 from the tank interior; and a sealing seat 5 which possesses a sealing surface 4, which coacts with a closure flap 3. The sealing surface 4 is constituted by the inside of a wall section 6, which section extends itself to the interior of the tank. In accord with this aspect of the present invention, the sealing surface is likewise radially widened, forming thus at the entry to the tank interior a (as seen on the drawing) a downward opening conical frustum. Toward the upper side, on the wall section 6, i.e., of the housing 1, relative to the centerline axis 7 of the input opening 2, is integrally molded a radially running, annular wall 8, which encompasses the input opening 2. On the housing 1 is installed an input funnel 9. This input funnel 9 incorporates a truncated tubular shaped, outer wall 10, on the inside of which, wall sections 12 are disposed, which extend themselves radially inward, on which, narrow, inclined inlet 13 panels converge downward toward the centerline axis. The total of all such inclined inlet panels 13 forms a guided channel 14, which assures a reliable entry of the discharge tube 15 of an external fuel filling nozzle 16 (FIG. 6) into the input opening 2. The input funnel 9 is within a shell-like cap 17, the under rim of which is coaxially connected with the end face of a surrounding collar 21a.

The closure flap 3 is, essentially, made from a circular disk, from the circumferential rims of which, extend two flanges 19, 20. These flanges, 19, 20 enclose between them an annular groove 22 into which is inserted, during the assembly period, a structurally strong elastomer, for example, FPM. The rim zone of the closure flap 3 is designed to be somewhat complementary to the cone-shaped seat 5 of the sealing means. In accordance with this arrangement, the diameter of the flange 19 is less than the diameter of the flange 20. As formed in the original molding, an apron 24 is attached to the lower flange 20. The apron 24 extends itself over more than half of the circumference of the flange 20. At least the outer surface 25 of the apron 24 forms a part of a conical outer surface which possesses the same angle of inclination as the sealing seat 4, that is, as the sealing surface 4. On the underside, on the apron 24 is integrally attached a radial, outward extending arm 26, which carries two tangentially separated pivot-eyes 27, which, respectively are formed by two essentially elongated openings extending in the direction of the central axis 31 of the closure flap 3. The elongated openings 28, during assembly, are penetrated by a pivotal axle 29, the ends of which axle engage themselves in a guide groove 30, which is placed within the housing 1. The axle extends itself in the direction of the central, longitudinal axis 29 of the extending groove 30. For the axial fixation of the pivotal axle 29, in each guide groove 30, is inserted a clamp device 32. The pivotal axle 29 is circumferentially encased by a coiled spring 33, the first arm 34 of which abuts itself on the housing and the second arm 35 thereof exerts its force on the underside of the closure flap 3. The named parts are held fixed in their closed position (FIG. 3, 4). In this way, the sealing ring 23 is pressed against the sealing surface 4.

Figure 7:
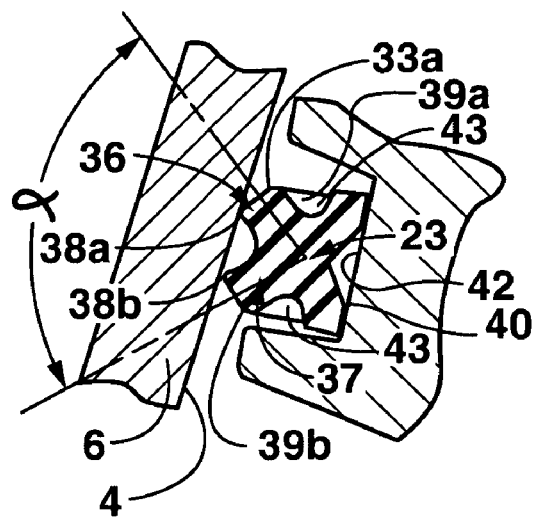

The inserted sealing ring 23, within the ring-groove 22 of the closure flap 3, on that side which coacts with the sealing surface 4, possesses two lip-seals 36, 37 (respectively, first and second lip-seals). These are placed to be inclined in relation to one another and thus create an open angle $\alpha$ (FIG. 7) with the sealing surface. In the case of the presented embodiment, the angle $\alpha$ runs some 90°. The free end of the lip-seals 36, 37 are, in the radial direction, somewhat at right angles and have, respectively, an inner rim 38a, 38b and an outer rim 39a, 39b. That side of the sealing ring 23, which is remote from the lip-seals 36, 37, is a flat side, which lies on the groove bottom 42 as a counter surface with a tension directed radially toward the inside. The sealing ring 23 has a topside, a bottom side and a mid-grooving 43 in its circumferential surface. The bottom of the groove 42 is a part of a conical outer casing with an inclination to agree with that of the sealing surface 4.

Figure 4:
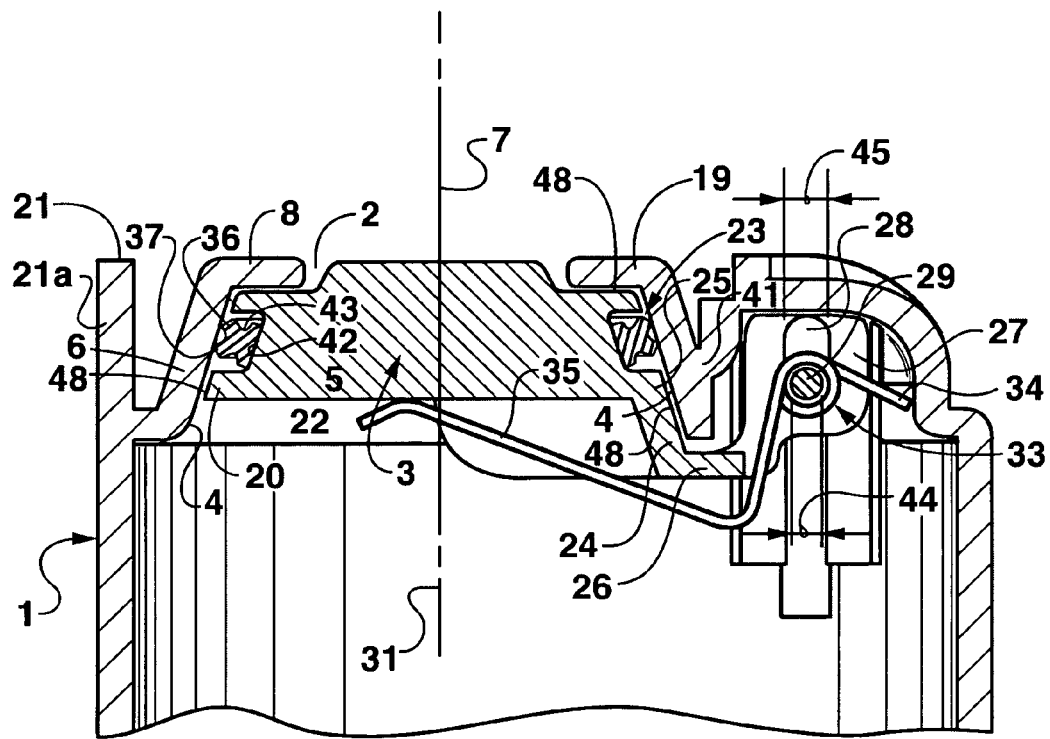
FIG. 4 a detail from FIG. 3.
Figure 6:
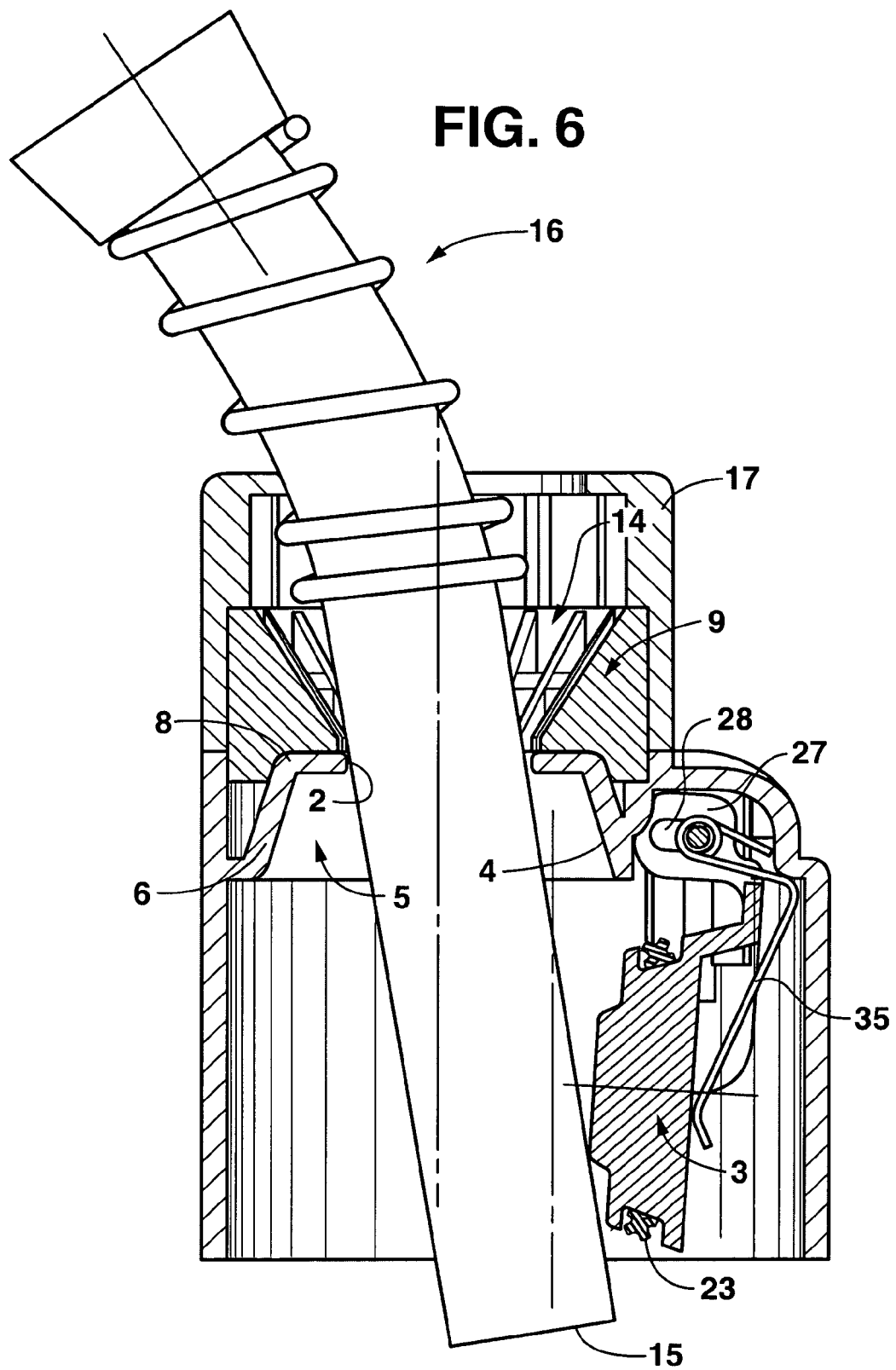

If, during a filling process, a delivery nozzle discharge tube 16, as shown in FIG. 6, is introduced into the input opening 2, then, the closure flap 3 is compelled to move counter to the action of the coiled spring 33 into the "open"

state of the closure flap. For this displacement, due to the relatively small spring-force of the coiled spring, a thereto corresponding lesser expenditure of force is required from the user. If after the filling of the tank is ended, the nozzle tube 16 is withdrawn from the tank opening, then the closure flap snaps by self-action back into its "closed" position. In this it lies with the sealing ring 23 on the sealing surface 4. The closure flap and the wall area 6 are so pre-dimensioned, that in the closed position, between them is created a fissure 48. So that, due to this swinging of the closure flap 3 against the conical sealing seat 4, a self-actuated centering can be brought about, an appropriate, predetermined play is built into the pivotal bearings of the closure flap 3, which the bearings were formed by the pivotal axle and the pivotal eyes 27. This play arises, first, because of the fact, that the diameter 44 (FIG. 4) of the pivotal axle 29 is less than the open width 45 of the extended elongated openings 28 of the pivotal eyes 27. The closure flap 3 now has the freedom to adjust itself, for a self-initiated centering, within the conical sealing seat 5 in a direction which runs at right angles to the pivotal axle 29 and runs also in a radial plane 41 to the extent of a incremental distance, which represents the difference from the pivotal axle diameter 44 and the inside width of an elongated opening 28. Since the closure flap 3 is not affixed axially on the pivotal axle 29, it is possible for the closure flap 3 to move in the longitudinal direction thereof.

Figure 5:
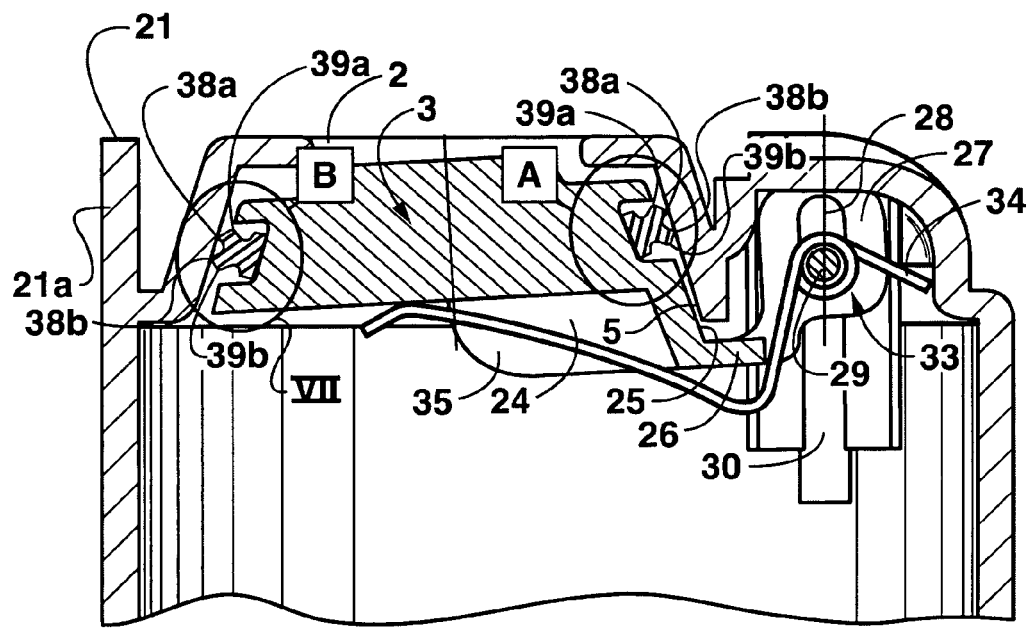
FIG. 5 a reproduction of FIG. 4 in which a closure flap is placed in an intermediate position, FIG. 6 a tank closure such as FIG. 3 in which an input discharge tube penetrates same, FIG. 7 an excerpt from FIG. 5 in an enlarged scale, and FIG. 8 a modified sealing ring as in FIG. 7.

Upon the swinging of the closure flap 3 against the conical sealing seat 4, the lip-seals 36, 37 would be so deformed that they would move away from each other. In other words, the angle α enclosed therebetween would be greater. As is evident in FIG. 5, the inner rim 38b contacts the inner sealing zone against the sealing surface 5 (see detail A), while, in the outer sealing zone, remote from the pivotal axle 29, the inner rim 38a strikes against the sealing surface 5 (see detail B). In the closed state, the two inner rims 38a, 38b are in full circumferential contact with the sealing surface 5. Where a self actuated centering of the closure flap 3 is concerned, in the sealing seat 4 a lever action of the sealing ring is made use of, in order to push or swing the closure flap into its centermost position. The flat plane contact surface of the flat side 40 on the bottom of the groove 42 provides assurance that the sealing ring 23 retains its relative position in regard to the closure flap 3. That means the sealing ring 23 is not lifted from the bottom of the groove 42 and thus opens the possibility that it can twist itself. A secure fixation of the sealing ring 23 onto the closure flap 3, for example, could possibly be done, if a material-based attachment of the sealing ring 23 with the closure flap 3 could be vulcanized. Exactly in accordance with an off-center placement between the closure flap 3 and the sealing seat 4, a displacement of the pivotal axle 29 in the direction of the central axis 7 can be instrumental in bringing about self actuated centering. Such a movement is assured by the elongated bearing opening 28. This, however, fulfills yet another function: In the course of the operational life of a tank closure, the material of the housing 1 and especially the material of the sealing rings 23 can absorb fuel vapors, whereby the components will swell. For the sealing ring 23, this means, that its diameter increases as a result of the swelling. A swelled sealing ring 23 can no longer carry out its sealing function as it did in the original positioning within the sealing surface. Also, on the basis of the increase in diameter of the sealing ring 23, a repositioning of the closure flap 3 to a lower position located closer to the interior of the tank is in order. Such a change of the axial position of the closure flap 3 is permitted by the elongated openings 28, in that the sealing surface 4, has a length of such magnitude, that it can be influenced by the sealing ring, even in the case of a different, changed axial position of the closure flap 3 due to an axial sliding action thereof.

Figure 8:
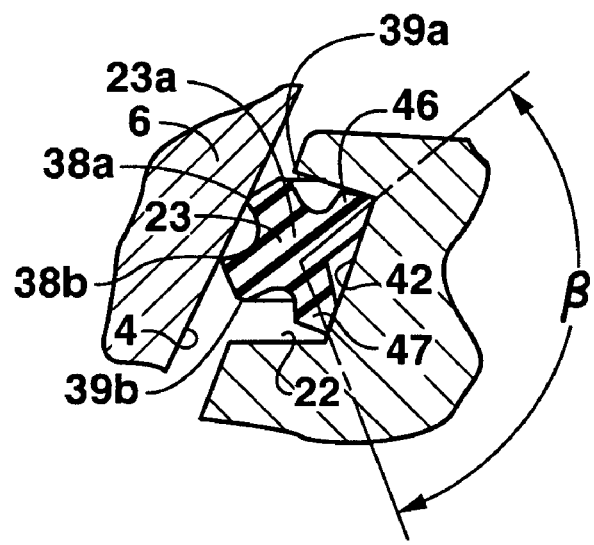

The interface between the flat side 40 and the bottom of the groove 42 opens a possible path, by which the fuel vapors can escape to the outside environment. An improved sealing arrangement can be achieved in this matter, in that instead of the flat side 40, two lip-seals 46, 47 (respectively, third and fourth lip-seals) can be made available for the sealing ring 23a (FIG. 8). This situation would be similar to the manner in which the lip-seals 36, 37 are applied, which also extend themselves away from each other and thereby open an angle α to the groove bottom. In the case of the angle presented in the embodiment shown in FIG. 8, this would be obtuse to the extent of more than 90°. A prevention of a permeation through the interface between the sealing ring 23 and the bottom of the groove 42 is open to the possibility that alternately, again, the sealing ring 23 could be vulcanized onto the closure flap 3.

While preferred embodiments have been shown and described, those skilled in the art will recognize that changes and modifications may be made to the foregoing examples without departing from the scope and spirit of the invention. For example, specific styles and dimensions of various elements of the illustrated embodiments and materials used for those elements may be altered to suit particular applications and industry regulations. It is thus intended to claim all such changes and modifications as fall within the scope of the appended claims and their equivalents.

Moreover, references herein to "top," "bottom," "over," "under," "outer," and "inner" structures, elements and geometries and the like are intended solely for purposes of providing an enabling disclosure and in no way suggest limitations regarding operative orientation of the invention or its equivalents.

The invention claimed is:

1. An automatic tank closure for a motor vehicle tank, comprising:
   a housing having therethrough an input opening, the input opening normally closed by a closure flap held in a closed position by spring force, whereby in a closed space defined between the closure flap and the housing a sealing ring is inserted;
   a conical sealing seat interposed between the housing and the closure flap, the sealing seat widening toward a tank interior, the sealing seat configured to coact with the sealing ring and possessing a sealing surface wherein the sealing ring has at least one lip-seal which coacts with the sealing surface;
   wherein the closure flap is pivotable on the housing configured with a predetermined tolerance such that a self-acting centering of the closure flap in regard to the sealing seat is enabled and wherein the closure flap defines at least one pivotal eye and further comprising a pivotal axle, the pivotal eye being penetrated by the pivotal axle, a diameter of the pivotal axle being smaller than an open width of the pivotal eye, whereby the closure flap is movable in a direction at right angles to the pivotal eye and lies in a radial plane.

2. A tank closure in accord with claim 1, wherein the sealing ring possesses a smooth side remote from the lip-seal with which it abuts against a counter surface which supports the sealing ring.

3. A tank closure in accord with claim 1, wherein the sealing ring includes two lip-seals which are axially disposed thereon at a specified spacing.

4. A tank closure in accord with claim 3, wherein the two lip-seals are disposed in angular cross-section to one another, whereby the two lip-seals embrace an angle (α) opening to the sealing surface.

5. A tank closure in accord with claim 2, wherein at a location proximate the smooth side two axially separated lip-seals are present.

6. A tank closure in accord with claim 1, further comprising a pivotal bearing configured to permit an axial displacement of the closure flap into the closed position, the sealing surface defining a length such that it is sealingly contacted by the sealing ring in a case of changed axial positions of the closure flap due to axial movement thereof.

7. A tank closure in accord with claim 6, wherein the pivotal bearing is molded onto the closure flap by at least one pivotal eye, the pivotal eye defining an elongated opening therethrough for a pivotal axle, which can penetrate the pivotal eye and extend itself transversely to the axis of the elongated opening.

8. A tank closure in accord with claim 1, the sealing ring is affixed on a rim zone of the closure flap.

9. A fuel tank closure, comprising:
a housing defining an input opening therethrough and a sealing seat disposed proximate the input opening, the input opening configured for insertion of a filler nozzle into a tank interior, the sealing seat having a sealing surface conical in cross section widening in a direction of the tank interior;
a closure flap attached by a pivotal arrangement to a portion of the housing and urged by a spring force to close the input opening, a counter force applied by the filler nozzle sufficient to overcome the spring force to open the input opening, the sealing surface and the closure flap defining a space therebetween when the input opening is closed, the pivotal arrangement defining a predetermined tolerance such that a self-acting centering of the closure flap in regard to the sealing seat is enabled;
a sealing ring defining at least one lip-seal thereabout, the sealing ring disposed in the space between the sealing surface and the closure flap, the lip-seal configured to contact the conically shaped sealing surface to seal the input opening when the spring force urges the closure flap to close the input opening and wherein the closure flap defines at least one pivotal eye and further comprising a pivotal axle, the pivotal eye being penetrated by the pivotal axle, a diameter of the pivotal axle being smaller than an open width of the pivotal eye, whereby the closure flap is movable in a direction at right angles to the pivotal eye and lies in a radial plane.

10. The tank closure as in claim 9, wherein closure flap defines a groove therein, the sealing ring disposed in the space between the sealing surface and the groove of the closure flap.

11. The tank closure as in claim 9, wherein the sealing ring defines a first lip-seal and a second lip-seal disposed axially apart from each other such that the first lip-seal is disposed between the input opening and the second lip-seal, the first and second lip-seals each defining a rim having an inner portion and an opposing outer portion, the inner portion disposed proximate the portion of the housing attached to the closure flap, the outer portion of the first lip-seal and the inner portion of the second lip-seal configured to seal against the sealing surface.

12. The tank closure as in claim 10, wherein the sealing ring defines a third lip-seal and a fourth lip-seal disposed axially apart from each other such that the third lip-seal is disposed between the input opening and the fourth lip-seal, the third and fourth lip-seals each defining a rim having an inner portion and an opposing outer portion disposed at an angle to each other in a groove of the closure flap to prevent fuel vapor permeation therethrough.

13. The tank closure as in claim 10, further comprising a pivotal bearing configured to axial displace the closure flap to open and close the input opening, the pivotal bearing affixed on the housing and defining a tolerance to enable self-centering of the closure flap relative to the sealing seat.

14. A fuel tank closure, comprising:
a housing defining an input opening therethrough and a sealing seat disposed proximate the input opening, the input opening configured for insertion of a filler nozzle into a tank interior, the sealing seat having a sealing surface conical in cross section widening in a direction of the tank interior;
a closure flap attached by a pivtal arrangement to a portion of the housing and urged by a spring force to close the input opening, a counter force applied by the filler nozzle sufficient to overcome the spring force to open the input opening, the sealing surface and the closure flap defining a space therebetween when the input opening is closed, the pivotal arrangement defining a predetermined tolerance such that a self-acting centering of the closure flap in regard to the sealing seat is enabled;
a sealing ring defining a first lip-seal and a second lip-seal disposed in the space between the sealing surface and the closure flap and axially apart from each other such that the first lip-seal is disposed between the input opening and the second lip-seal, the first and second lip-seals each defining a rim having an inner portion and an opposing outer portion, the inner portion disposed proximate the portion of the housing attached to the closure flap, the outer portion of the first lip-seal and the inner portion of the second lip-seal configured to contact the conically shaped sealing surface to seal the input opening when the spring force urges the closure flap to close the input opening and wherein the closure flap defines at least one pivotal eye and further comprising a pivotal axle, the pivotal eye being penetrated by the pivotal axle, a diameter of the pivotal axle being smaller than an open width of the pivotal eye, whereby the closure flap is movable in a direction at right angles to the pivotal eye and lies in a radial plane.

15. The tank closure as in claim 14, wherein the sealing ring defines a third lip-seal and a fourth lip-seal disposed axially apart from each other such that the third lip-seal is disposed between the input opening and the fourth lip-seal, the third and fourth lip-seals each defining a rim having an inner portion and an opposing outer portion disposed at an angle to each other in a groove of the closure flap to prevent fuel vapor permeation therethrough.

16. The tank closure as in claim 14, further comprising a pivotal bearing configured to axial displace the closure flap to open and close the input opening, the pivotal bearing affixed on the housing and defining a tolerance to enable self-centering of the closure flap relative to the sealing seat.

* * * * *